US012706509B2

(12) United States Patent
Kee et al.

(10) Patent No.: US 12,706,509 B2
(45) Date of Patent: Aug. 11, 2026

(54) GENERATOR FOR A VEHICLE

(71) Applicant: Schaeffler Technologies AG & Co. KG, Herzogenaurach (DE)

(72) Inventors: Noah Kee, Rittman, OH (US); Jai Patel, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 184 days.

(21) Appl. No.: 18/808,505

(22) Filed: Aug. 19, 2024

(65) Prior Publication Data

US 2026/0051790 A1 Feb. 19, 2026

(51) Int. Cl.

*H02K 7/18* (2006.01)
*H02K 5/173* (2006.01)
*H02K 9/19* (2006.01)

(52) U.S. Cl.

CPC ........... *H02K 7/1846* (2013.01); *H02K 5/173* (2013.01); *H02K 9/19* (2013.01)

(58) Field of Classification Search

CPC ......... H02K 5/173; H02K 7/1846; H02K 9/19
USPC ......................................... 310/52, 54, 58, 64
See application file for complete search history.

(56) References Cited

U.S. PATENT DOCUMENTS 11,692,443 B2 * 7/2023 Jones ........................ F03B 5/00 415/90
12,145,692 B2 * 11/2024 Dodman .................. B62J 43/13
12,188,553 B1 * 1/2025 Ruder ..................... F16H 48/40
2021/0122227 A1 * 4/2021 Bindl ...................... B60T 13/12
2021/0309099 A1 * 10/2021 Long ........................ B60K 1/00
2021/0347242 A1 * 11/2021 Payne .................. F16F 15/123
2021/0370757 A1 * 12/2021 Pfeifer ................... H02K 7/075
2022/0029488 A1 * 1/2022 Belzile ..................... H02K 1/27
2022/0055471 A1 * 2/2022 Ideue ..................... B60K 6/387
2022/0074477 A1 * 3/2022 Hammond ............. B60K 6/485
2022/0195944 A1 * 6/2022 Friedberg ................ F01D 5/005
2022/0196127 A1 * 6/2022 Rößner .................. B60K 6/387
2022/0227185 A1 * 7/2022 Kannatti ........... B60C 23/00363
2022/0316394 A1 * 10/2022 Yazaki ................... H02K 5/225
2022/0320945 A1 * 10/2022 Yazaki .................... F01D 25/16
2022/0320966 A1 * 10/2022 Yazaki ................ H02K 7/1823
2022/0320969 A1 * 10/2022 Yazaki ................... H02K 24/00
2022/0372730 A1 * 11/2022 Long ..................... F16D 25/044
2023/0047255 A1 * 2/2023 Yazaki .................... F16N 31/00
2023/0167887 A1 * 6/2023 Lee ......................... F16H 45/02
2023/0231438 A1 * 7/2023 Yazaki ................ H02K 7/1823 290/52

(Continued)

*Primary Examiner* — Rashad H Johnson
(74) *Attorney, Agent, or Firm* — Price Heneveld LLP

(57) ABSTRACT

A generator includes a housing that defines a housing region and a fluid passage that forms a portion of a fluid circuit and includes an outlet in fluid communication with the housing region, a pump configured to convey fluid along the fluid passage, a bearing disposed about the pump, an alternator having a stator and a rotor disposed within the housing region, and a hub configured to receive torque for rotation about an axis. The hub is coupled with the rotor, such that rotation of the hub about the axis drives rotation of the rotor about the axis, and is coupled with the pump, such that rotation of the hub about the axis operates the pump. The hub defines an interior volume and comprises a bearing carrier engaged with the bearing, such that the bearing supports and facilitates rotation of the bearing carrier relative to a portion of the pump.

20 Claims, 2 Drawing Sheets

(56) References Cited

U.S. PATENT DOCUMENTS

| | | | | |
|---|---|---|---|---|
| 2023/0261541 | A1* | 8/2023 | Ronning | H02K 5/203<br>310/54 |
| 2023/0313812 | A1* | 10/2023 | Himmelmann | F04D 29/263<br>60/39.34 |
| 2023/0336043 | A1* | 10/2023 | Sridharan | H02K 9/19 |
| 2023/0358236 | A1* | 11/2023 | Yamarthi | F04D 13/06 |
| 2024/0030774 | A1* | 1/2024 | Chapanar | H02K 9/197 |
| 2024/0266903 | A1* | 8/2024 | Kinion | H02K 5/203 |
| 2024/0318636 | A1* | 9/2024 | Langvardt Krogh | H02K 7/1838 |
| 2024/0372439 | A1* | 11/2024 | Linton | H02K 1/22 |
| 2024/0413687 | A1* | 12/2024 | Schmitt | H02K 1/2706 |
| 2025/0083305 | A1* | 3/2025 | Johnson | B60K 17/303 |
| 2025/0129724 | A1* | 4/2025 | Millier | F01D 7/00 |
| 2025/0188999 | A1* | 6/2025 | Ackermann | F16D 35/02 |
| 2025/0214411 | A1* | 7/2025 | Jonker | B60K 7/0007 |
| 2025/0246967 | A1* | 7/2025 | Mogro Zambrano | H02K 5/203 |
| 2026/0018950 | A1* | 1/2026 | Sridharan | H02K 1/32 |
| 2026/0051790 | A1* | 2/2026 | Kee | H02K 7/1846 |

* cited by examiner

GENERATOR FOR A VEHICLE

FIELD OF THE DISCLOSURE

The present disclosure generally relates to a generator for a vehicle. More specifically, the present disclosure relates to a generator that includes a hub with a bearing carrier that has a collar portion with an inner surface that includes a tapered portion.

BACKGROUND OF THE DISCLOSURE

Vehicles often include generators that are configured to receive torque from a prime mover and generate electricity therefrom.

SUMMARY OF THE DISCLOSURE

According to a first aspect of the present disclosure, a generator includes a housing that defines a housing region and a fluid passage that forms a portion of a fluid circuit and includes an outlet in fluid communication with the housing region, a pump configured to convey fluid along the fluid passage, a bearing disposed about the pump, an alternator having a stator and a rotor disposed within the housing region, and a hub configured to receive torque for rotation about an axis. The hub is coupled with the rotor, such that rotation of the hub about the axis drives rotation of the rotor about the axis, and is coupled with the pump, such that rotation of the hub about the axis operates the pump. The hub defines an interior volume and comprises a bearing carrier engaged with the bearing, such that the bearing supports and facilitates rotation of the bearing carrier relative to a portion of the pump. The bearing carrier defines an access opening that extends through the bearing carrier from the interior volume to an exterior environment of the hub, and the bearing carrier includes a collar portion proximate to the access opening and having an inner surface that defines a hollow in the exterior environment of the hub and includes a tapered portion that tapers radially inboard as the tapered portion of the inner surface extends axially away from the access opening.

Embodiments of the first aspect of the disclosure can include any one or a combination of the following features:

- the outlet of the fluid passage is disposed within the hollow;
- the tapered portion of the inner surface extends axially toward the access opening to a shelf of the inner surface that extends radially outboard from the tapered portion;
- the hub defines a plurality of ports positioned radially outboard of the access opening that extend through the hub from the interior volume to the exterior environment of the hub;
- rotation of the hub about the axis operates the pump to convey fluid through the fluid passage and out of the outlet into the hollow defined by the inner surface of the collar portion of the bearing carrier, and the tapered portion of the inner surface of the collar portion propels fluid axially toward the access opening of the bearing carrier as the hub rotates;
- rotation of the hub propels fluid within the interior volume of the hub radially outboard and through the plurality of ports defined by the hub into the exterior environment of the hub to cool the alternator;
- rotation of the hub about the axis prompts fluid to be conveyed along the fluid circuit from the pump through the fluid passage, out of the fluid passage via the outlet to the hollow defined by the collar portion of the bearing carrier in the exterior environment of the hub, onto the tapered portion of the inner surface of the collar portion, along the tapered portion axially toward the access opening defined by the bearing carrier, through the access opening defined by the bearing carrier from the exterior environment of the hub to the interior volume of the hub, and through the plurality of ports from the interior volume to the exterior environment of the hub and onto the alternator;
- the hub includes a receiving aperture for receiving a fastener configured to couple the hub to a shaft, wherein the receiving aperture and the access opening are radially and circumferentially aligned;
- the hub includes a rotor coupler portion that is engaged with the rotor, and a shaft coupler portion that is configured to be engaged with a shaft from which the hub is configured to receive torque for rotation about the axis, wherein the bearing carrier extends radially inboard from the rotor coupler portion; and
- the rotor coupler portion defines a plurality of ports positioned radially outboard of the access opening, and the shaft coupler portion defines a receiving aperture that is radially and circumferentially aligned with the access opening.

According to a second aspect of the present disclosure, a vehicle an engine that drives rotation of a shaft and a generator. The generator includes an alternator having a stator and a rotor, and a hub operably coupled to and configured to receive torque from the shaft for rotation about an axis. The hub is coupled with the rotor, such that rotation of the hub about the axis drives rotation of the rotor about the axis. The hub defines an interior volume and includes a bearing carrier that defines an access opening that extends through the bearing carrier from the interior volume to an exterior environment of the hub. The bearing carrier has a collar portion proximate to the access opening and has an inner surface that defines a hollow in the exterior environment of the hub and includes a tapered portion that tapers radially inboard as the tapered portion of the inner surface extends axially away from the access opening.

Embodiments of the second aspect of the disclosure can include any one or a combination of the following features:

- the tapered portion of the inner surface extends axially toward the access opening to a shelf of the inner surface that extends radially outboard from the tapered portion;
- the generator further includes a pump configured to convey fluid along a fluid circuit of the generator, and a bearing disposed radially between the pump and the bearing carrier and configured to support and facilitate rotation of the bearing carrier relative to a portion of the pump;
- the hub includes a receiving aperture for receiving a fastener configured to couple the hub to the shaft, and wherein the receiving aperture and the access opening are radially and circumferentially aligned;
- the hub includes a rotor coupler portion that is engaged with the rotor, and the shaft coupler portion that is configured to be engaged with a shaft from which the hub is configured to receive torque for rotation about the axis, wherein the bearing carrier extends radially inboard from the rotor coupler portion; and
- the rotor coupler portion defines a plurality of ports positioned radially outboard of the access opening, and the shaft coupler portion defines a receiving aperture that is radially and circumferentially aligned with the access opening.

According to a third aspect of the present disclosure, a hub for a generator that is configured to be operably couple with an alternator and receive torque for rotation about an axis includes a bearing carrier that defines an access opening that extends through the bearing carrier from an interior volume defined by the hub to an exterior environment of the hub. The bearing carrier includes a collar portion that is proximate to the access opening and that has an inner surface that defines a hollow in the exterior environment of the hub. The inner surface includes a tapered portion that tapers radially inboard as the tapered portion of the inner surface extends axially away from the access opening.

Embodiments of the third aspect of the disclosure can include any one or a combination of the following features:

- the tapered portion of the inner surface extends axially toward the access opening to a shelf of the inner surface that extends radially outboard from the tapered portion;
- the hub includes a rotor coupler portion that is configured to be engaged with a rotor of the alternator, and a shaft coupler portion that is configured to be engaged with a shaft from which the hub is configured to receive torque for rotation about the axis, wherein the bearing carrier extends radially inboard from the rotor coupler portion; and
- the rotor coupler portion defines a plurality of ports positioned radially outboard of the access opening, and the shaft coupler portion defines a receiving aperture that is radially and circumferentially aligned with the access opening.

These and other features, advantages, and objects of the present disclosure will be further understood and appreciated by those skilled in the art by reference to the following specification, claims, and appended drawings.

Figure 1:
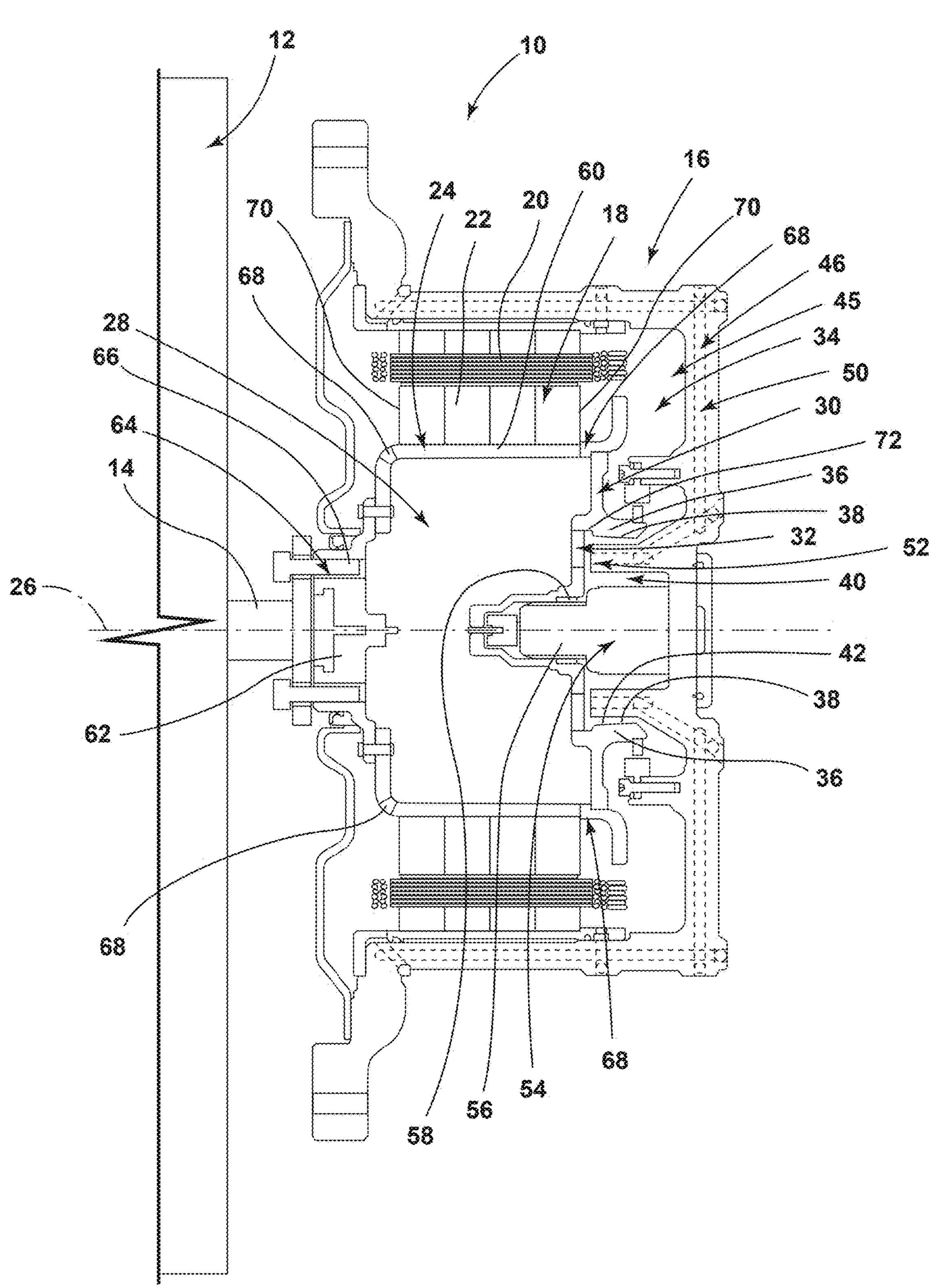
FIG. 1 is a cross-sectional view of a portion of a vehicle, illustrating an engine and a generator operably coupled to the engine via a shaft, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a hub configured to rotate in operation of the apparatus described herein. Further, the term "radial" and derivatives thereof, such as "radially," shall be understood in relation to the axis of the aforementioned hub. For example, "radially outboard" refers to further away from the axis, while "radially inboard" refers to nearer to the axis. The term "circumferential" and derivatives thereof, such as "circumferentially," shall be understood in relation to the axis of the aforementioned hub.

Figure 2:
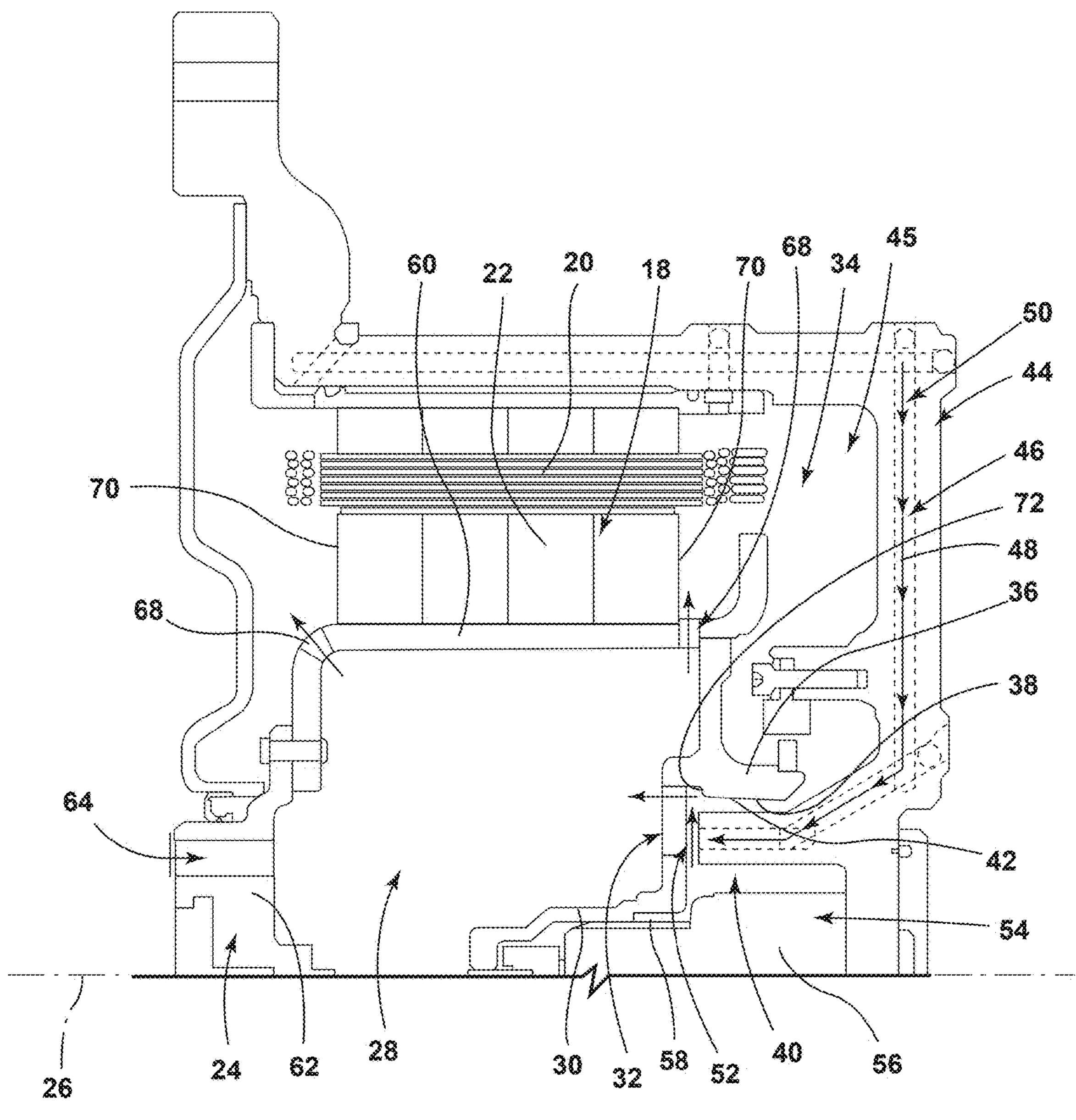
FIG. 2 is a cross-sectional view of a portion of a generator, illustrating a housing, an alternator disposed within the housing, a pump disposed within the housing, and a hub that includes a bearing carrier, according to one embodiment.

Referring now to FIGS. 1 and 2, a vehicle 10 includes an engine 12. The engine 12 drives rotation of a shaft 14. A generator 16 includes an alternator 18 having a stator 20 and a rotor 22. The generator 16 further includes a hub 24 that is operably coupled to and configured to receive torque from the shaft 14 for rotation about an axis 26. The hub 24 is coupled with the rotor 22 such that rotation of the hub 24 about the axis 26 drives rotation of the rotor 22 about the axis 26. The hub 24 defines an interior volume 28. The hub 24 includes a bearing carrier 30. The bearing carrier 30 defines an access opening 32 that extends through the bearing carrier 30 from the interior volume 28 to an exterior environment 34 of the hub 24. The bearing carrier 30 includes a collar portion 36 that is proximate to the access opening 32. The collar portion 36 includes an inner surface 38 that defines a hollow 40 in the exterior environment 34 of the hub 24. The inner surface 38 includes a tapered portion 42 that tapers radially inboard as the tapered portion 42 of the inner surface 38 extends axially away from the access opening 32.

Referring now to FIG. 1, the vehicle 10 includes the engine 12 and the generator 16. A variety of types of vehicles 10 and engines 12 are contemplated. For example, the vehicle 10 may be a land vehicle 10 that includes an internal combustion engine 12. The engine 12 is operable to drive rotation of the shaft 14 that is operably coupled thereto. The shaft 14 operably coupled with the engine 12 is operably coupled with the generator 16, such that the rotational movement of the shaft 14 may result in a generation of electricity.

As illustrated in FIG. 1, in various implementations, the generator 16 includes a housing 44. The housing 44 can be an assembly of a plurality of components, in some examples. For example, in the embodiment illustrated in FIG. 1, the housing 44 is a die-cast aluminum housing 44 that is formed of a plurality of components. In various embodiments, the housing 44 defines a housing region 45. Various components of the generator 16 may be disposed within the housing region 45 defined by the housing 44, as illustrated in FIG. 1. In various implementations, the housing 44 may define a fluid passage 46 along which fluid 48 is configured to be conveyed. The fluid passage 46 may form a portion of a fluid circuit 50 of the generator 16 along which fluid 48 is conveyed during operation of the generator 16, as described further herein. The fluid passage 46 includes an outlet 52 that is in fluid communication with the housing region 45, as illustrated in FIG. 1.

As illustrated in FIGS. 1 and 2, in various embodiments, the generator 16 includes a pump 54. The pump 54 may be configured to convey fluid 48 along the fluid passage 46 defined by the housing 44. The pump 54 may include a plurality of components. Certain components of the pump 54 may be generally rotationally-stationary relative to the axis 26 while other components of the pump 54 may be configured to rotate about the axis 26 during operation of the pump 54 to pump fluid 48. In an exemplary embodiment, the pump 54 may include a pump housing 56 that is generally rotationally stationary relative to the axis 26, and the pump housing 56 may house a plurality of pump components configured to pump fluid 48 within the fluid circuit 50 of the generator 16. In various implementations, the pump 54 is operably coupled with the hub 24 of the generator 16, such that rotation of the hub 24 about the axis 26 operates the pump 54, as described further herein.

As illustrated in FIGS. 1 and 2, in various implementations, a bearing 58 is disposed about the pump 54. For example, as illustrated in FIG. 1, the bearing 58 extends circumferentially about a portion of the pump housing 56. The bearing 58 may extend radially between the pump 54 and the hub 24, such that the bearing 58 supports and facilitates rotation of the hub 24 about the axis 26, as described further herein.

Referring now to FIGS. 1 and 2, the generator 16 includes the hub 24. The hub 24 is configured to receive torque for rotation about the axis 26. As illustrated in FIG. 1, the hub 24 is coupled with the rotor 22 of the alternator 18, such that rotation of the hub 24 about the axis 26 drives rotation of the rotor 22 about the axis 26. This rotation of the rotor 22 relative to the stator 20 of the alternator 18 generates electricity for use or storage in, for example, a battery. As illustrated in FIG. 1, the hub 24 is coupled with the shaft 14, such that rotation of the shaft 14 by the engine 12 rotates the hub 24 about the axis 26. As such, the hub 24 is configured to receive torque for rotation about the axis 26 via the shaft 14 attached thereto.

In the embodiment illustrated in FIG. 1, the hub 24 includes a rotor coupler portion 60 that is configured to be engaged with the rotor 22 of the alternator 18, a shaft coupler portion 62 that is configured to be engaged with the shaft 14, and the bearing carrier 30. In the illustrated embodiment, the rotor coupler portion 60, the shaft coupler portion 62, and the bearing carrier 30 are distinct components that are assembled to form the hub 24. It is contemplated that the rotor coupler portion 60, shaft coupler portion 62 and/or the bearing carrier 30 may be integrally coupled as a single unitary body, in some embodiments.

As illustrated in FIG. 1, in various implementations, the hub 24 defines an interior volume 28. In some embodiments, the hub 24 defines a receiving aperture 64. The receiving aperture 64 may be configured to receive a fastener 66 therein for coupling the shaft 14 to the hub 24. In the embodiment illustrated in FIG. 1, the shaft coupler portion 62 of the hub 24 defines a plurality of receiving apertures 64, and bolts 66 extend through corresponding apertures defined by a flange of the shaft 14 and the receiving apertures 64 to couple the shaft 14 with the hub 24. In some embodiments, the hub 24 can include a plurality of ports 68. The ports 68 may be defined by the rotor coupler portion 60 of the hub 24 and may be disposed axially beyond axial ends 70 of the rotor 22 in the first and/or second axial directions. For example, as illustrated in FIG. 1, the rotor coupler portion 60 includes a plurality of ports 68 that extend from the interior volume 28 of the hub 24 to the exterior environment 34 of the hub 24 and that are disposed axially beyond the respective axial ends 70 of the rotor 22 of the alternator 18.

Referring now to FIGS. 1 and 2, the bearing carrier 30 of the hub 24 extends radially inboard from the rotor coupler portion 60. As illustrated in FIGS. 1 and 2, in various implementations, the bearing carrier 30 is engaged with the bearing 58, such that the bearing 58 supports and facilitates rotation of the bearing carrier 30 relative to a portion of the pump 54, such as the housing 56 of the pump 54, as illustrated in FIGS. 1 and 2. As illustrated in FIG. 2, the bearing carrier 30 defines the access opening 32. The access opening 32 extends through the bearing carrier 30 from the interior volume 28 to the exterior environment 34 of the hub 24. In various implementations, the bearing carrier 30 defines a plurality of access openings 32, as illustrated exemplarily in FIG. 1. As illustrated in FIGS. 1 and 2, the plurality of ports 68 defined by the hub 24 are positioned radially outboard of the access opening 32 defined by the bearing carrier 30. In some embodiments, the receiving aperture 64 defined by the hub 24 is radially and circumferentially aligned with the access opening 32 defined by the bearing carrier 30. For example, as illustrated in FIG. 1, the receiving apertures 64 defined by the shaft coupler portion 62 of the hub 24 are radially and circumferentially aligned with the access openings 32 defined by the bearing carrier 30. In some implementations, the receiving apertures 64 and access openings 32 may be aligned in this manner so that access to the receiving apertures 64 and/or the fasteners 66 disposed therein may be achievable via the aligned access openings 32 defined by the bearing carrier 30.

Referring now to FIGS. 1 and 2, the bearing carrier 30 includes the collar portion 36. The collar portion 36 is disposed proximate to the access opening 32 and includes an inner surface 38. The inner surface 38 defines the hollow 40. The hollow 40 is in the exterior environment 34 of the hub 24, as illustrated in FIG. 1. As illustrated in FIG. 2, the inner surface 38 of the collar portion 36 includes the tapered portion 42. As illustrated, the tapered portion 42 tapers radially inboard as the tapered portion 42 of the inner surface 38 extends axially away from the access opening 32. In the illustrated embodiment, the tapered portion 42 of the inner surface 38 extends axially toward the access opening 32 to a shelf 72 of the inner surface 38 that extends radially outboard from the tapered portion 42. The inner surface 38 extends axially onward therefrom to the access opening 32.

It is contemplated that the tapered portion 42 may extend to the access opening 32 without interruption, in some implementations.

Referring now to FIGS. 1 and 2, in operation of the vehicle 10, the engine 12 drives rotation of the shaft 14. Rotation of the shaft 14 results in the application of torque on the hub 24 of the generator 16, which prompts rotation of the hub 24 about the axis 26. Rotation of the hub 24 about the axis 26 causes rotation of the rotor 22 of the alternator 18 relative to the stator 20, which generates electricity for use in the vehicle 10. Rotation of the hub 24 about the axis 26 during operation of the generator 16 operates the pump 54 of the generator 16 to convey fluid 48 through the fluid passage 46 and out of the outlet 52 of the fluid passage 46 into the hollow 40 defined by the inner surface 38 of the collar portion 36 of the bearing carrier 30. As illustrated in FIG. 2, the outlet 52 of the fluid passage 46 is disposed within the hollow 40 defined by the inner surface 38 of the collar portion 36 of the bearing carrier 30. As fluid 48 (e.g., oil) exits the outlet 52 of the fluid passage 46 and enters the hollow 40 defined by the inner surface 38 of the collar portion 36, some of the fluid 48 may flow to the inner surface 38 of the collar portion 36. The tapered portion 42 of the inner surface 38 of the collar portion 36 propels fluid 48 axially toward the access opening 32 of the bearing carrier 30 as the hub 24 rotates. This fluid 48 that flows through the access opening 32 defined by the bearing carrier 30 enters the interior volume 28 defined by the hub 24. As the hub 24 rotates about the axis 26, fluid 48 is propelled within the interior volume 28 of the hub 24 radially outboard and through the plurality of ports 68 defined by the hub 24 into the exterior environment 34 of the hub 24 to cool the alternator 18. The ports 68 defined by the hub 24 being disposed axially beyond the respective axial ends 70 of the rotor 22 of the alternator 18 may ensure that fluid 48 is delivered to the windings of the stator 20 of the alternator 18 for cooling thereof.

In an exemplary embodiment of the generator 16, rotation of the hub 24 about the axis 26 prompts fluid 48 to be conveyed along the fluid circuit 50 from the pump 54 through the fluid passage 46, out of the fluid passage 46 via the outlet 52 to the hollow 40 defined by the collar portion 36 of the bearing carrier 30 in the exterior environment 34 of the hub 24, onto the tapered portion 42 of the inner surface 38 of the collar portion 36, along the tapered portion 42 axially toward the access opening 32 defined by the bearing carrier 30, through the access opening 32 defined by the bearing carrier 30 from the exterior environment 34 of the hub 24 to the interior volume 28 of the hub 24, and through the plurality of ports 68 from the interior volume 28 to the exterior environment 34 of the hub 24 and onto the alternator 18.

The generator 16 of the present disclosure may provide a variety of advantages. For example, the bearing carrier 30 including the collar portion 36 that has the inner surface 38 that includes the tapered portion 42 may ensure that fluid 48 that is disposed within the hollow 40 defined by the collar portion 36 is propelled toward the access opening 32 defined by the bearing carrier 30 due to the tapered shape of the inner surface 38. This may prevent undesirable stagnation of fluid 48 within the hollow 40 that may occur in the absence of the tapered portion 42 of the inner surface 38.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 vehicle
12 engine
14 shaft
16 generator
18 alternator
20 stator
22 rotor
24 hub
26 axis
28 interior volume
30 bearing carrier
32 access opening
34 exterior environment
36 collar portion
38 inner surface
40 hollow
42 tapered portion
44 housing
45 housing region
46 fluid passage
48 fluid
50 fluid circuit
52 outlet
54 pump
56 pump housing
58 bearing
60 rotor coupler portion
62 shaft coupler portion
64 receiving aperture
66 fastener/bolt
68 port
70 axial ends
72 shelf

What is claimed is:

1. A generator, comprising:

a housing that defines a housing region and a fluid passage that forms a portion of a fluid circuit and includes an outlet in fluid communication with the housing region;

a pump configured to convey fluid along the fluid passage;

a bearing disposed about the pump;

an alternator having a stator and a rotor disposed within the housing region; and a hub configured to receive torque for rotation about an axis, the hub being coupled with the rotor, such that rotation of the hub about the axis drives rotation of the rotor about the axis, and being coupled with the pump, such that rotation of the hub about the axis operates the pump, wherein the hub defines an interior volume and comprises:

a bearing carrier engaged with the bearing, such that the bearing supports and facilitates rotation of the bearing carrier relative to a portion of the pump, wherein the bearing carrier defines an access opening that extends through the bearing carrier from the interior volume to an exterior environment of the hub, and the bearing carrier includes a collar portion proximate to the access opening and having an inner surface that defines a hollow in the exterior environment of the hub and includes a tapered portion that tapers radially inboard as the tapered portion of the inner surface extends axially away from the access opening.

2. The generator of claim 1, wherein the outlet of the fluid passage is disposed within the hollow.

3. The generator of claim 2, wherein the tapered portion of the inner surface extends axially toward the access opening to a shelf of the inner surface that extends radially outboard from the tapered portion.

4. The generator of claim 2, wherein the hub defines a plurality of ports positioned radially outboard of the access opening that extend through the hub from the interior volume to the exterior environment of the hub.

5. The generator of claim 4, wherein rotation of the hub about the axis operates the pump to convey fluid through the fluid passage and out of the outlet into the hollow defined by the inner surface of the collar portion of the bearing carrier, and the tapered portion of the inner surface of the collar portion propels fluid axially toward the access opening of the bearing carrier as the hub rotates.

6. The generator of claim 5, wherein rotation of the hub propels fluid within the interior volume of the hub radially outboard and through the plurality of ports defined by the hub into the exterior environment of the hub to cool the alternator.

7. The generator of claim 6, wherein rotation of the hub about the axis prompts fluid to be conveyed along the fluid circuit from the pump through the fluid passage, out of the fluid passage via the outlet to the hollow defined by the collar portion of the bearing carrier in the exterior environment of the hub, onto the tapered portion of the inner surface of the collar portion, along the tapered portion axially toward the access opening defined by the bearing carrier, through the access opening defined by the bearing carrier from the exterior environment of the hub to the interior volume of the hub, and through the plurality of ports from the interior volume to the exterior environment of the hub and onto the alternator.

8. The generator of claim 1, wherein the hub includes a receiving aperture for receiving a fastener configured to couple the hub to a shaft, wherein the receiving aperture and the access opening are radially and circumferentially aligned.

9. The generator of claim 1, wherein the hub comprises:

a rotor coupler portion that is engaged with the rotor; and a shaft coupler portion that is configured to be engaged with a shaft from which the hub is configured to receive torque for rotation about the axis, wherein the bearing carrier extends radially inboard from the rotor coupler portion.

10. The generator of claim 9, wherein the rotor coupler portion defines a plurality of ports positioned radially outboard of the access opening, and the shaft coupler portion defines a receiving aperture that is radially and circumferentially aligned with the access opening.

11. A vehicle, comprising:

an engine that drives rotation of a shaft; and a generator, comprising:

an alternator having a stator and a rotor; and a hub operably coupled to and configured to receive torque from the shaft for rotation about an axis, the hub being coupled with the rotor, such that rotation of the hub about the axis drives rotation of the rotor about the axis, wherein the hub defines an interior volume and comprises:

a bearing carrier that defines an access opening that extends through the bearing carrier from the interior volume to an exterior environment of the hub, the bearing carrier having a collar portion proximate to the access opening and having an inner surface that defines a hollow in the exterior environment of the hub and includes a tapered portion that tapers radially inboard as the tapered portion of the inner surface extends axially away from the access opening.

12. The vehicle of claim 11, wherein the tapered portion of the inner surface extends axially toward the access opening to a shelf of the inner surface that extends radially outboard from the tapered portion.

13. The vehicle of claim 11, wherein the generator further comprises:

a pump configured to convey fluid along a fluid circuit of the generator; and a bearing disposed radially between the pump and the bearing carrier and configured to support and facilitate rotation of the bearing carrier relative to a portion of the pump.

14. The vehicle of claim 11, wherein the hub includes a receiving aperture for receiving a fastener configured to couple the hub to the shaft, and wherein the receiving aperture and the access opening are radially and circumferentially aligned.

15. The vehicle of claim 11, wherein the hub comprises:

a rotor coupler portion that is engaged with the rotor; and a shaft coupler portion that is configured to be engaged with the shaft from which the hub is configured to receive torque for rotation about the axis, wherein the bearing carrier extends radially inboard from the rotor coupler portion.

16. The vehicle of claim 15, wherein the rotor coupler portion defines a plurality of ports positioned radially outboard of the access opening, and the shaft coupler portion defines a receiving aperture that is radially and circumferentially aligned with the access opening.

17. A hub for a generator that is configured to be operably couple with an alternator and receive torque for rotation about an axis, comprising:

a bearing carrier that defines an access opening that extends through the bearing carrier from an interior volume defined by the hub to an exterior environment of the hub, wherein the bearing carrier includes a collar portion that is proximate to the access opening and that has an inner surface that defines a hollow in the exterior environment of the hub, wherein the inner surface includes a tapered portion that tapers radially inboard as the tapered portion of the inner surface extends axially away from the access opening.

18. The hub of claim 17, wherein the tapered portion of the inner surface extends axially toward the access opening to a shelf of the inner surface that extends radially outboard from the tapered portion.

19. The hub of claim 18, wherein the hub comprises:

a rotor coupler portion that is configured to be engaged with a rotor of the alternator; and a shaft coupler portion that is configured to be engaged with a shaft from which the hub is configured to receive torque for rotation about the axis, wherein the bearing carrier extends radially inboard from the rotor coupler portion.

20. The hub of claim 19, wherein the rotor coupler portion defines a plurality of ports positioned radially outboard of the access opening, and the shaft coupler portion defines a receiving aperture that is radially and circumferentially aligned with the access opening.

* * * * *